United States Patent
Stetson

(10) Patent No.: US 10,252,937 B1
(45) Date of Patent: Apr. 9, 2019

(54) VITREOUS FRIT

(75) Inventor: Alvin R. Stetson, San Diego, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 07/210,585

(22) Filed: Jun. 21, 1988

(51) Int. Cl.
- *C03C 8/02* (2006.01)
- *C03C 8/00* (2006.01)
- *C03C 3/087* (2006.01)
- *C03C 3/083* (2006.01)
- *C03C 3/085* (2006.01)

(52) U.S. Cl.
CPC ............... *C03C 8/00* (2013.01); *C03C 3/083* (2013.01); *C03C 3/087* (2013.01); *C03C 8/02* (2013.01); *C03C 3/085* (2013.01)

(58) Field of Classification Search
CPC ......... C03C 3/083; C03C 3/085; C03C 3/087; C03C 8/00; C03C 8/02
See application file for complete search history.

(56) References Cited

U.S. PATENT DOCUMENTS

| | | | | |
|---|---|---|---|---|
| 3,098,753 A | * | 7/1963 | Van Dolah et al. | 501/70 |
| 3,110,613 A | | 11/1963 | Bean | 117/71 |
| 3,384,508 A | * | 5/1968 | Bopp et al. | 501/21 |
| 3,849,097 A | * | 11/1974 | Giffen et al. | 501/69 |
| 4,731,347 A | * | 3/1988 | Stetson | C03C 8/02 501/21 |

FOREIGN PATENT DOCUMENTS

| | | | | |
|---|---|---|---|---|
| DE | 2061254 | * | 7/1971 | 501/70 |
| FR | 2097400 | * | 3/1972 | 501/64 |

* cited by examiner

*Primary Examiner* — Elizabeth A. Bolden
(74) *Attorney, Agent, or Firm* — Raytheon Company

(57) ABSTRACT

A vitreous frit comprising the following by weight percentage ranges:

| | |
|---|---|
| $SiO_2$ | 40-60 |
| $Al_2O_3$ | 5-20 |
| $Na_2O$ | 10-35 |
| $Li_2O$ | 0-6 |
| CaO | 0-10 |
| SrO | 0-5 |
| BaO | 0-5 |
| $CeO_2$ | 0-5 |
| $TiO_2$ | 0-9. |

2 Claims, No Drawings

VITREOUS FRIT

TECHNICAL FIELD

The present invention relates generally to ceramic compositions and, more particularly, to a vitreous frit composition.

BACKGROUND OF THE INVENTION

Electromagnetic radiation (EMR) absorbers have been used in a variety of applications. Generally speaking, applications where electromagnetic radiation absorbers are subjected to temperatures of less than about 500° F. permit the use of certain, well-known, organic materials. At temperatures above 500° Fahrenheit, organic EMR absorbers tend to fail and/or break down with a severe deterioration in their EMR absorbing capability. For application temperatures above 500° F. and less than about 1100° F., EMR absorber coatings comprising ferromagnetic particles dispersed in a dielectric are commonly used. Examples of such coating and constituents thereof are found in U.S. Pat. No. 4,731,347 (issued Mar. 15, 1988), U.S. Serial No. 855,218 (filed Mar. 21, 1986), U.S. Serial No. 891,827 (allowed Aug. 6, 1987), U.S. Serial No. 855,201 (filed Mar. 21, 1986), and U.S. Serial No. 855,199 (allowed Jan. 12, 1988). For application temperatures above about 1100° F., the ferromagnetic particle component (typically carbonyl iron and iron 10 aluminum) of such coatings oxidize rapidly—especially for ferromagnetic particle sizes of less than about 10 microns, causing substantial reduction in the absorbing capacity of the EMR absorbers.

The coefficient of thermal expansion for the composite EMR coatings is generally much less than the coefficient of thermal expansion for typical substrates (often nickel base alloys) on which the coatings are applied. Such differential thermal expansion rates result in stress fracturing of the coatings, and in some cases, spalling of the coatings from the associated substrates. Use of oxidation resistant ferromagnetic particles as a dispersed material in a vitreous matrix tends to exacerbate the problem, for example when aluminum or chromium is added to iron matrix attack increases, coating spalling increases, and radar cross-section of the substrate increases.

The EMR absorber designer, on the one hand, seeks a particle which is a good conductor and, on the other hand, is not such a good conductor as to have unreasonably small skin depths and thus require unreasonably small particle sizes. Such small skin depths and small conductive particle sizes increase the coatings' constituent cost, application cost, and accelerate particle oxidation.

At present no EMR absorber coating is known which: (1) has good absorption characteristics for application temperatures over about 1100° F.; (2) has a coefficient of thermal expansion closely approximating that of typical nickel base alloys; and (3) is applicable to substrates in reasonable thicknesses.

DISCLOSURE OF THE INVENTION

In accordance with one aspect of the present invention, there is provided a glass frit comprising by weight percentage: $SiO_2$, 40-60; $Al_2O_3$, 5-20; $Na_2O$, 10-35; $Li_2O$, 0-6; CaO, 0-10; SrO, 0-5; BaO, 0-5; $CeO_2$, 0-5; and $TiO_2$, 0-9.

BEST MODE FOR CARRYING OUT THE INVENTION

Manufacture of electromagnetic radiation (EMR) absorbers has typically, for temperatures above about 500° F., included ferromagnetic conductive material uniformly dispersed in a vitreous matrix. Such EMR absorbers are often applied in the form of coatings to substrates whose EMR cross section is advantageously minimized. Electromagnetic radiation impinging on such absorber coatings induce eddy currents in the dispersed particles causing dissipation of the EMR energy. The vitreous matrix constitutes a dielectric which surrounds and separates the individual, electrically conducting particles and, thus, minimizes the electromagnetic (radar) cross section of the substrate underlying the coating by preventing the individual particles from cooperatively establishing eddy currents over a substantial area and reflecting impinging electromagnetic radiation.

EMR absorption is often advantageously used in applications whose temperature is in excess of 1100° F. The manufacture and application of a coating for EMR absorption at lower, as well as higher, application temperatures is described hereinafter.

A vitreous frit having the following range of constituents is wet milled (preferably in methanol) until an average frit particle size of <2-6 microns is preferably obtained:

| Constituent | Weight Percent |
|---|---|
| $SiO_2$ | 40-60 |
| $Al_2O_3$ | 5-20 |
| $Na_2O$ | 10-35 |
| $Li_2O$ | 0-6 |
| CaO | 0-10 |
| SrO | 0-5 |
| BaO | 0-5 |
| $CeO_2$ | 0-5 |
| $TiO_2$ | 0-9 |

The frit material has a coefficient of thermal expansion between about $5.5 \times 10^{-6}/°$ F. and $8.0 \times 10^{-6}/°$ F. from room temperature to 1000° F. depending largely upon the $Na_2O$ content with greater $Na_2O$ percentages providing higher thermal expansion.

While the above illustrates a preferred set of weight ranges for the frit constituents, the preferred frit (by weight percentage) constitutes the following:

| Constituent | Weight Percent |
|---|---|
| $SiO_2$ | 49 |
| $Al_2O_3$ | 12 |
| $Na_2O$ | 15 |
| $Li_2O$ | 4 |
| CaO | 10 |
| SrO | 2 |
| BaO | 3 |
| $CeO_2$ | 5 |

A preliminary slip which results from wet milling the above described frit in methanol has a preferred constituent composition of 1000 grams of frit and 500 milliliters of methanol.

The antiferromagnetic or conductive phase of the EMR absorber coating is preferably selected from NiO, $CoO_x$ (where $1 \leq x \leq 1.33$), FeO, $Fe_2O_3$, and/or $MnO_x$ (where $1 \leq x \leq 2$) and is milled into particles whose average size falls between 2 and 18 microns. There is no precise correlation between the preferred particle sizes of the frit and conducting phase particles except that for each conducting phase particle to be advantageously surrounded and isolated from other conducting phase particles, the frit particles must be smaller than the conducting phase particles. The preferred antiferromagnetic materials are NiO, $CoO_x$, and $Fe_2O_3$. NiO and $CoO_x$ are virtually equivalent in their EMR absorption characteristics and coefficients of thermal expansion ($7.6\times10^{-6}/°$ F.). $Fe_2O_3$ with or without doping with 0.1-0.5 mole percent $TiO_2$ is also a good EMR absorber when dispersed in the vitreous phase. NiO and $CoO_x$ have relatively higher EMR absorption characteristics at low temperatures (less than about 1000° F.) while $Fe_2O_3$ has a higher EMR absorption capability at higher temperatures (over about 1000° F.).

A slip is formed by combining the preliminary slip and the conducting phase described hereinbefore, mixing them thoroughly and adding a volatile vehicle such as methanol to enable the slip to be sprayed on a desired substrate or dipped therein without agglomeration of the vitreous/conducting phase mixture. While the final coating advantageously has a high volume percentage of the conducting phase, preferably in the range of 40-70 volume percent, the EMR absorber coating of interest has about 54 volume percent of conducting phase. 350 grams of the milled conducting phase is mixed with 100 milliliters of the hereinbefore described preliminary slip and methanol is added until the resulting slip's viscosity approximates that of an enameling slip. No precise quantity of added methanol can be suggested since it is a function of the slip's average particle size with more methanol being required for smaller average particle size. Additionally, a commercial suspending agent up to 1% may be advantageously used to minimize slip settling. Use of methanol permits application of the slip by spraying to the substrate without wetting and/or causing flotation separation during application and drying for coating thicknesses in the 0.015-0.025 inch range.

Subsequent to applying the slip to the substrate, the substrate/coating is air fired at a temperature of about 1600° F. Judicious selection of slip constituent percentage compositions (including other frit compositions which are not described in detail herein but which are known to those skilled in the art) permit the coating's firing temperature to be adjusted within the range of 1100° to 2100° F. Additional layers of the slip mixture may be applied and then fired until the total EMR absorber coating's thickness is obtained which provides optimum EMR absorption for the EMR frequency of interest—from 0.04-0.1 inches but typically 0.060-0.085 inches.

The electrical conductivity of the antiferromagnetic material is adjusted (doped) to provide the desired performance characteristics by reacting same with a monovalent doping oxide such as $Li_2O$ or a tetravalent doping oxide such as $TiO_2$—depending on the material to-be-doped. The monovalent oxide is preferably included in the vitreous frit to cause the doping to occur during firing of the EMR absorber coating on the substrate. Alternatively, such doping oxide may be reacted directly with the antiferromagnetic material in quantities of 0.005 to 0.5 mole percent of the antiferromagnetic material, depending upon the desired electrical conductivity of the antiferromagnetic material.

INDUSTRIAL APPLICABILITY

An electromagnetic radiation coating made in accordance with the present disclosure will provide effective electromagnetic radiation absorption up to about 1800° F., will closely match the thermal expansivity of the underlying substrate, will be chemically stable, and will not significantly oxidize upon exposure thereof to high temperatures. The high volume percentage of the conducting phase in the EMR absorber is desired to counteract the typically lower coefficient of thermal expansion exhibited by the vitreous phase and thus provides a composite coefficient of thermal expansion for the EMR coating which approximately matches that of nickel base alloys such as Hastelloy X. Such thermal expansion match of the conducting phase coupled with the high volume fraction thereof: (1) minimizes thermal stresses induced by differences in coefficients of thermal expansion between the coating and the substrate; and (2) prevents increases in the radar cross section of the substrate resulting from fracture and spalling of the coating from the substrate.

The invention claimed is:

1. A non-crystalline glass frit having a firing temperature in the range of about 1350-1800° F., having a coefficient of thermal expansion in the range of about $5.5\times10^{-6}/°$ F.-$8.0\times10^{-6}/°$ F. from room temperature to about 1000° F., and consisting essentially of the following constituents and weight percentages:

| | |
|---|---|
| $SiO_2$ | 40-60 |
| $Al_2O_3$ | 5-20 |
| $Na_2O$ | 10-35 |
| $Li_2O$ | 0-6 |
| CaO | 0-10 |
| SrO | 0-5 |
| BaO | 0-5 |
| $CeO_2$ | 0-5 |
| $TiO_2$ | 0-9. |

2. The glass frit as set forth in claim 1 wherein the percent by weight is as follows:

| | |
|---|---|
| $SiO_2$ | 49 |
| $Al_2O_3$ | 12 |
| $Na_2O$ | 15 |
| $Li_2O$ | 4 |
| CaO | 10 |
| SrO | 2 |
| BaO | 3 |
| $CeO_2$ | 5. |

* * * * *